United States Patent
Sjoesten et al.

(10) Patent No.: US 8,678,410 B2
(45) Date of Patent: Mar. 25, 2014

(54) ADJUSTABLE RATE LEAF SPRING SUSPENSION

(75) Inventors: Kjell Sjoesten, Vaestra Froelunda (SE); Ake Malm, Aelvaengen (SE)

(73) Assignee: Volvo Car Corporation, Geoteborg (SE)

( * ) Notice: Subject to any disclaimer, the term of this patent is extended or adjusted under 35 U.S.C. 154(b) by 0 days.

(21) Appl. No.: 13/466,213

(22) Filed: May 8, 2012

(65) Prior Publication Data

US 2012/0286492 A1 Nov. 15, 2012

(30) Foreign Application Priority Data

May 10, 2011 (EP) .................................... 11165390

(51) Int. Cl.
*B60G 11/08* (2006.01)
(52) U.S. Cl.
USPC ......... 280/124.171; 280/124.17; 280/124.175
(58) Field of Classification Search
CPC ..... B60G 11/08; B60G 11/107; B60G 17/023
USPC ...................... 280/124.101, 124.17, 124.171,
280/124.172, 124.173, 124.175; 267/36.1,
267/229, 246, 247, 260, 264, 234, 242
See application file for complete search history.

(56) References Cited

U.S. PATENT DOCUMENTS

| | | | |
|---|---|---|---|
| 1,336,481 A * | 4/1920 | Nettenstrom | 267/244 |
| 1,640,778 A * | 8/1927 | Laher | 267/45 |
| 3,913,941 A * | 10/1975 | Guerriero et al. | 280/124.145 |
| 4,422,666 A | 12/1983 | Proctor | |
| 4,458,918 A * | 7/1984 | Rumpel | 280/124.143 |
| 4,540,197 A * | 9/1985 | Finn et al. | 280/6.157 |
| 4,725,074 A * | 2/1988 | Stevens | 280/124.128 |
| 4,869,472 A * | 9/1989 | de Goncourt | 267/52 |
| 4,886,254 A * | 12/1989 | Carpentier et al. | 267/148 |
| 4,887,841 A * | 12/1989 | Cowburn et al. | 280/124.109 |

(Continued)

FOREIGN PATENT DOCUMENTS

DE 10323732 A1 12/2004
EP 0760750 A1 3/1997

(Continued)

OTHER PUBLICATIONS

European Patent Office, European Search Report for corresponding European Patent Application No. EP 11 16 5390 mailed Jul. 15, 2011.

*Primary Examiner* — Joseph M Rocca
*Assistant Examiner* — Barry Gooden, Jr.
(74) *Attorney, Agent, or Firm* — Brooks Kushman P.C.

(57) ABSTRACT

A suspension for a motor vehicle has a sub-frame and first and second control arm movably attached to opposite ends of the sub-frame. A leaf spring extends transversely across the sub-frame, a first end acting on the first control arm and a second end acting on the second control arm. A first spring seat is located between the leaf spring and the sub-frame, and is movable over a first range of positions relative to the leaf spring. A second spring seat is located between the leaf spring and the sub-frame, the second spring seat movable over a second range of positions relative to the leaf spring. An actuator is operatively connected to the first and second spring seats to move the first and second spring seats across their respective ranges of positions, thereby changing a spring rate of the leaf spring.

16 Claims, 3 Drawing Sheets

(56) References Cited

U.S. PATENT DOCUMENTS

| | | | |
|---|---|---|---|
| 4,903,984 A * | 2/1990 | Kajiwara et al. | 280/5.515 |
| 5,016,861 A | 5/1991 | Thompson et al. | |
| 5,141,209 A * | 8/1992 | Sano et al. | 267/36.1 |
| 5,251,930 A * | 10/1993 | Kusaka et al. | 280/124.14 |
| 6,029,987 A * | 2/2000 | Hoffman et al. | 280/124.171 |
| 6,273,441 B1 * | 8/2001 | Neavitt et al. | 280/124.174 |
| 6,457,729 B2 * | 10/2002 | Stenvall | 280/124.134 |
| 6,811,169 B2 * | 11/2004 | Schroeder et al. | 280/124.171 |
| 6,991,223 B2 * | 1/2006 | Platner et al. | 267/47 |
| 7,722,065 B2 * | 5/2010 | Platner et al. | 280/124.175 |
| 2010/0320658 A1 | 12/2010 | Mueller et al. | |

FOREIGN PATENT DOCUMENTS

| | | |
|---|---|---|
| EP | 0763438 A2 | 3/1997 |
| EP | 1645445 A1 | 4/2006 |
| JP | H01158206 U | 11/1989 |
| JP | 4121215 A | 4/1992 |
| JP | JH0679610 U | 11/1994 |

* cited by examiner

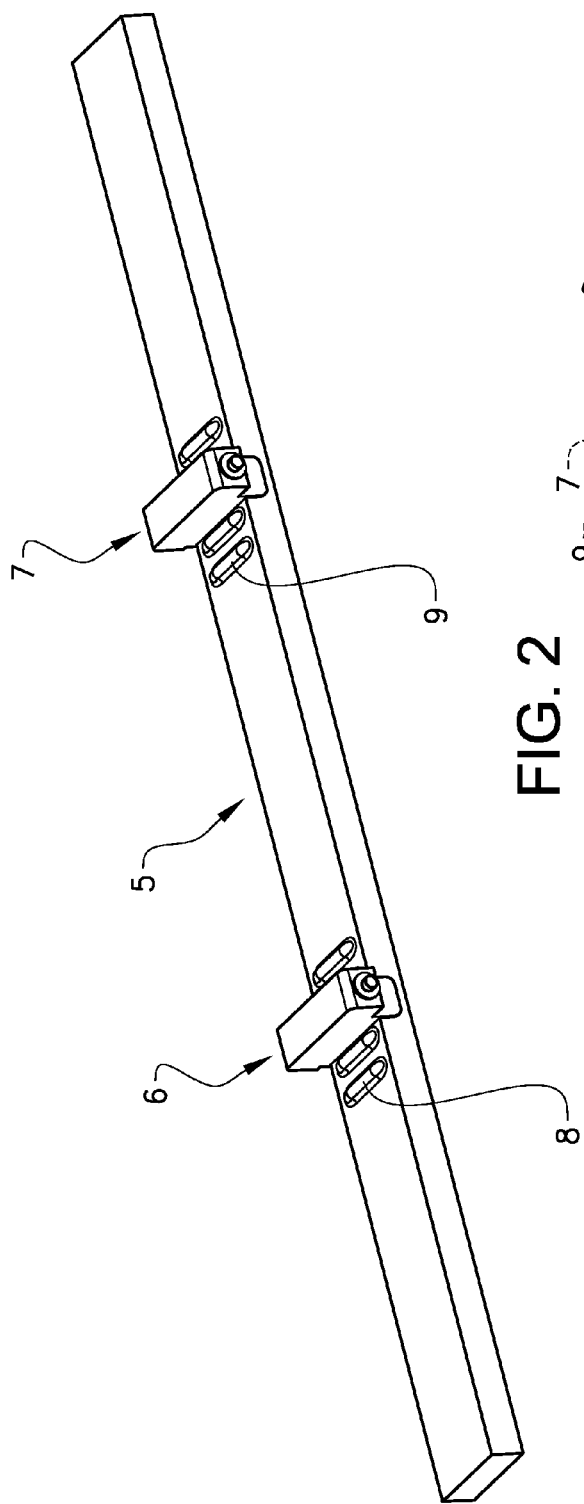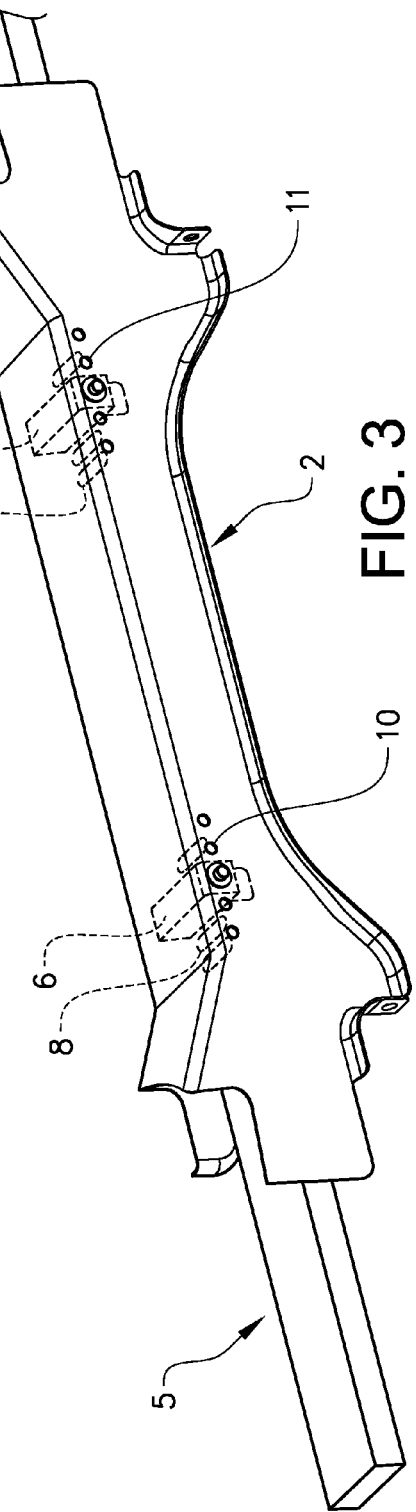

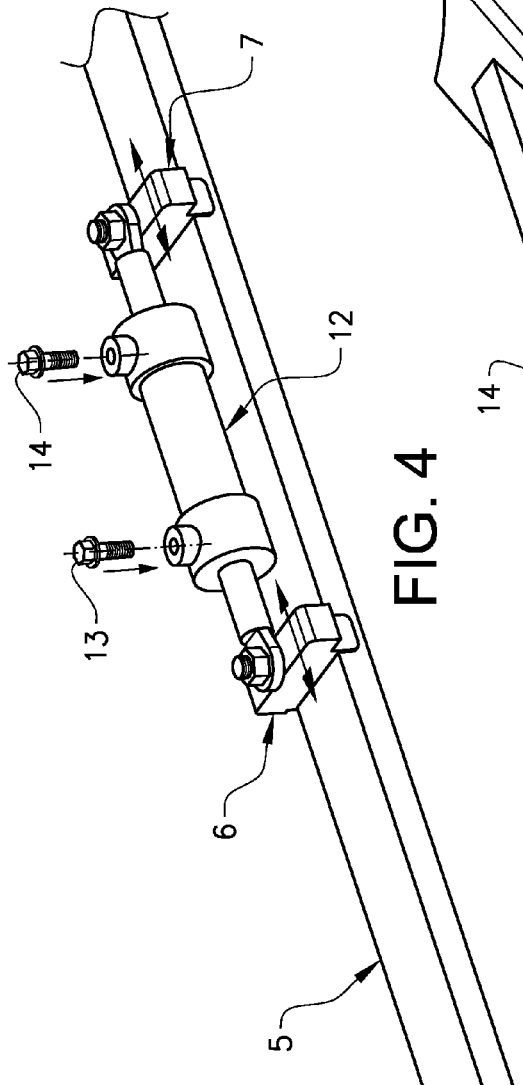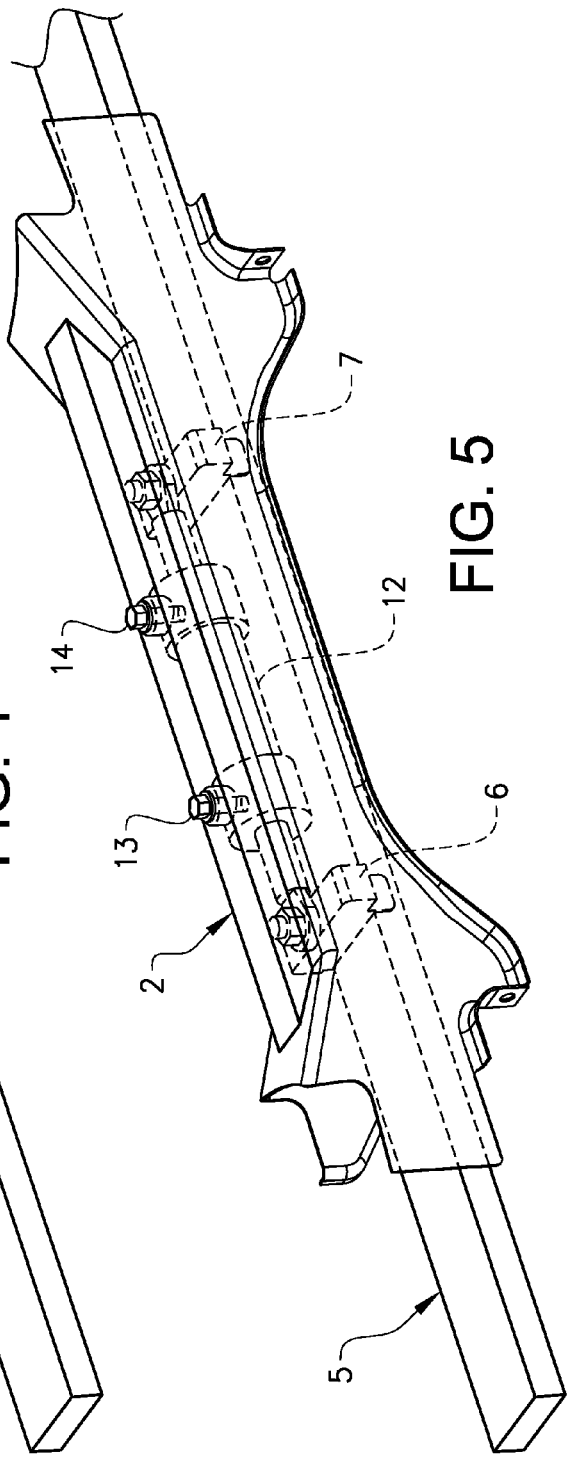

ADJUSTABLE RATE LEAF SPRING SUSPENSION

CROSS-REFERENCE TO RELATED APPLICATIONS

This application claims foreign priority benefits under 35 U.S.C. §119(a)-(d) to European Patent Application EP 11165390.3, filed May 10, 2011, the disclosure of which is incorporated in its entirety by reference herein.

TECHNICAL FIELD

The invention relates to a suspension for a motor vehicle using a transversely-mounted leaf spring to control movement of left and right control arms relative to a suspension sub-frame. More specifically, the invention relates to a method and apparatus for adjusting an effective spring rate of such a leaf spring suspension.

BACKGROUND

Suspensions for motor vehicles often comprise coil springs of different sizes in order to set the correct spring rate for a particular vehicle. The spring rate of the suspension may be set depending on the weight of the vehicle, the intended use of the vehicle, operator preferences, and/or many other considerations.

In order to be able to meet the wide variety of demands, a large number of coil springs with different spring rates must be kept in stock. During assembly (of the vehicle or the suspension system), when a specific spring rate is required an assembler has to find the correct set of coil springs out of several tens or even hundreds of sets having different spring rates. The system for marking the coil springs may be complicated due to the large number of coil springs. Being able to locate the correct set of springs may be difficult and time consuming. A further disadvantage of using coil springs is that they are heavy and bulky.

In some vehicles a leaf spring is used instead of a coil spring. The leaf spring may be mounted longitudinally or transversely. By using different types of arrangements the characteristic of the leaf spring may be changed.

Leaf spring suspension arrangements have been proposed which include various additional springs and/or other elements by which the characteristics of the leaf spring (the spring rate, for example) may be changed. See, for example, US Patent Application Publication 2010/0320658 A1. Such arrangements are mechanically complicated and do not allow for an easy adjustment of the spring characteristics.

SUMMARY

In a first embodiment of a suspension for a motor vehicle disclosed herein, a sub-frame for connection to a chassis of the vehicle has a first control arm movably attached to a first end of the sub-frame and a second control arm movably attached to a second end of the sub-frame. A leaf spring extends transversely across the sub-frame with a first end acting on the first control arm and a second end acting on the second control arm. A first spring seat is located between the leaf spring and the sub-frame, the first spring seat movable over a first range of positions relative to the leaf spring. A second spring seat is located between and contacts the leaf spring and the sub-frame, the second spring seat movable over a second range of positions relative to the leaf spring. Movement of the first and second spring seats through their respective first and second ranges of positions results in changing spring rates of the leaf spring acting on the two control arms.

In a further disclosed embodiment, a first plurality of locating features is on or associated with the leaf spring at the first range of positions, engagement between the first spring seat and at least one of the first plurality of locating features holding the first spring seat fixed relative to the leaf spring; and a second plurality of locating features is on or associated with the leaf spring at the second range of positions, engagement between the second spring seat and at least one of the second plurality of locating features holding the second spring seat fixed relative to the leaf spring.

According to a further disclosed embodiment, an actuator is operatively connected to the first and second spring seats and moves the first and second spring seats across their respective ranges of positions. The actuator may move the spring seats continuously across the ranges of positions, or between discrete positions.

According to a further disclosed embodiment, a method of adjusting a suspension of a motor vehicle comprises moving a first spring seat and a second spring seat along a transverse length of a leaf spring, the leaf spring supported relative to a sub-frame by the spring seats and having opposite first and second ends acting on a first control arm and a second control arm respectively, the first and second control arms movably attached to respective first and second ends of the sub-frame.

According to a further disclosed embodiment, a suspension for a motor vehicle comprises a sub-frame for connection to a chassis of the vehicle, a first control arm movably attached to a first end of the sub-frame, and a second control arm movably attached to a second end of the sub-frame. A leaf spring extends across the sub-frame and has a first end acting on the first control arm and a second end acting on the second control arm. A first spring seat is located between the leaf spring and the sub-frame, and is movable over a first range of positions relative to the leaf spring. A second spring seat is located between the leaf spring and the sub-frame, the second spring seat movable over a second range of positions relative to the leaf spring. An actuator is operatively connected to the first and second spring seats to move the first and second spring seats across their respective ranges of positions, thereby changing a spring rate of the leaf spring.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

FIG. 2 schematically shows a leaf spring with first and second movable spring seats;

FIG. 3 schematically shows a leaf spring similar to that shown in FIG. 2 in combination with a sub-frame;

FIG. 4 schematically shows a leaf spring with spring seats movable by an actuator; and FIG. 5 schematically shows a leaf spring similar to that shown in FIG. 4 in combination with a sub-frame

DETAILED DESCRIPTION

Figure 1:
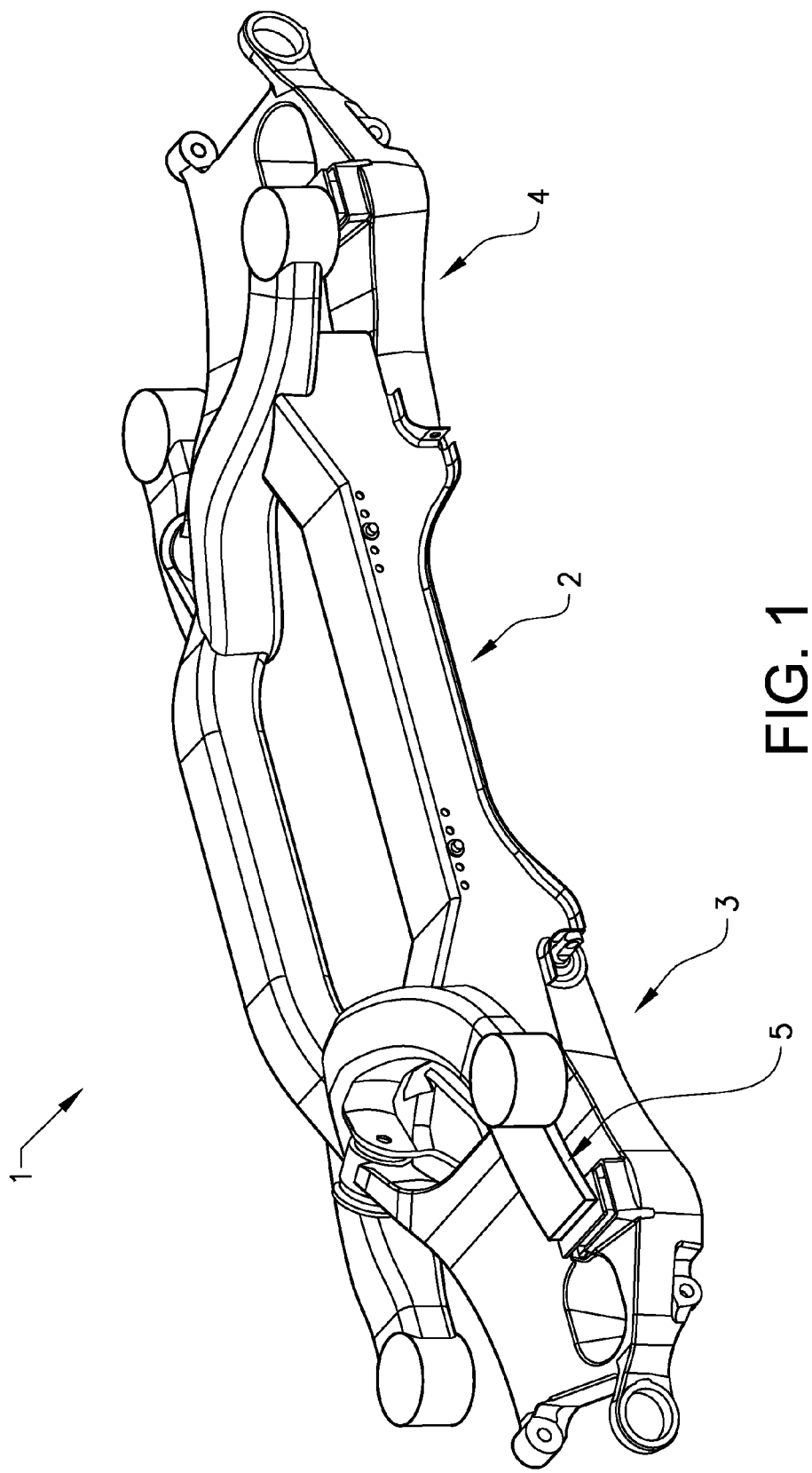
FIG. 1 schematically shows a rear suspension of a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As used herein, transverse direction, transversely, lateral, laterally, and similar terms mean a direction along an axis perpendicular to the normal travel direction of a vehicle, i.e. in a direction from one side of a vehicle to another side of a vehicle. Similarly, longitudinal direction, longitudinally or similar means a direction along an axis in the normal travel direction, i.e. in a direction from the rear of a vehicle to the front of a vehicle. A longitudinal centerline is an imagined line extending in a longitudinal direction located at the transverse center of a vehicle, i.e. at an equal distance from both longitudinal sides (a left side and a right side) of a vehicle.

FIG. 1 schematically shows a rear suspension 1 of a motor vehicle comprising a sub-frame 2, a first control arm 3, a second control arm 4 and a leaf spring 5. The sub-frame 2 is arranged to be attached to a chassis of the vehicle. The opposite ends of the leaf spring 5 act on the first control arm 3 and the second control arm 4, urging the control arms downwardly relative to the sub-frame 2 as is known in the art.

FIG. 2 schematically shows a leaf spring 5 along with a first spring seat 6 and a second spring seat 7. The first and second spring seats 6, 7 are arranged to be movable along the leaf spring 5. A first series or plurality of locating features 8 and second series or plurality of locating features 9 are located on or relative the leaf spring 5 and cover or span a first and a second range of mounting positions for spring seats 6, 7 respectively. The locating features 8, 9 may comprise lumps, indentations, cavities, protrusions, or similar features enabling the spring seats 6, 7 to be placed at held at any one of a number of specific locations within the range of mounting positions. The spring seats 6, 7 have mating features corresponding to the locating features 8, 9.

The ranges of mounting positions defined by placement of the locating features 8, 9 may extend over the entire width of the leaf spring 5 or only a part of the width of the leaf spring 5. The locating features 8, 9 may be made up of one or more parts extending over the entire width of the leaf spring 5 or only a part of the width of the leaf spring 5. The plurality of locating features 8, 9 within each range of mounting positions allows the possibility to change the spring rate during assembly of the suspension in order to be able to set a number of different settings for the spring rate for one type of vehicle depending on customer demand, and/or to have a vehicle with the possibility to change the spring rate after assembly.

The value of the spring rate of the leaf spring 5 may be adjusted by moving the spring seats 6, 7 along the transverse length of the leaf spring. Moving each of the spring seats 6, 7 an equal distance away from a longitudinal centerline of the leaf spring 5 increases the effective spring rate of the leaf spring acting on the control arms 3, 4. Moving the spring seats 6, 7 an equal distance towards a longitudinal centerline of the leaf spring 5 decreases the effective spring rate of the leaf spring acting on the control arms 3, 4. Moving the spring seats 6, 7 differentially (non-equal distances) along the leaf spring 5 changes the effective spring rate acting on the two control arms 3, 4 by a different amount for each control arm.

By allowing the spring seats 6, 7 to take up different positions along the leaf spring 5 the spring rate of the leaf spring may be varied. By varying the spring rate the suspension of the vehicle is made harder or softer depending on where the spring seats are positioned. By having to only adjust the location of the spring seats during assembly or service or repair the characteristics of the leaf spring, i.e. the spring rate of the leaf spring 5 is easily adjusted.

By having locating features 8, 9 at designed locations relative to other components of the suspension, known and fixed spring rates for different leaf springs may be calculated in advance allowing for an easier set-up for instance during assembly or during service or repair. This makes the assembly of vehicles adapted to special customer needs easier. At the same time, normal assembly is also made easier. During assembly, one leaf spring or a few leaf springs with different characteristics in combination with the possibility of selecting the location of the spring seats 6, 7 within the respective ranges of positions may cover a large variety of suspension settings. It may also allow for a user to change the suspension setting, for instance at a vehicle repair shop, should she/he not be satisfied with the factory settings.

As schematically shown in FIG. 3, the spring seats 6, 7 are positioned between the leaf spring 5 and the sub-frame 2 to serve as load-bearing points-of-contact (directly or indirectly) between spring and the sub-frame. The spring seats 6, 7 may be attached to the sub-frame 2 by means of respective first and second sets of holes 10, 11 in sub-frame 2. The spring seats 6, 7 are fastened to the sub-frame by means of suitable fasteners known in the art such as bolts or screws. The fasteners are arranged to be installed during assembly of the vehicle and may be loosened to move the spring seats in order to change the location of the spring seats and thereby change the spring rate of the leaf spring 5. The number of holes in the first set of holes 10 and the second set of holes 11 are preferably the same but may be different if an application demands it. In FIG. 3 the distance between the adjacent holes in the two set of holes 10, 11 are uniform. The distance between the holes in the set of holes 10, 11 may however vary depending, for example, on the desired settings of the spring rate of leaf spring 5, the weight of the vehicle loaded and unloaded or the design of the leaf spring 5.

The positions of the holes 10, 11 in the sub-frame 2 correspond to the positions of the locating features 8, 9 of the leaf spring 5. This means that the holes 10, 11 are aligned with the locating features 8, 9 of the leaf spring 5 enabling the spring seats 6, 7 located at one of the locating features 8, 9 to be fastened to the sub-frame 2 by means of suitable fasteners.

FIGS. 4 and 5 schematically show a suspension having an actuator 12 fastened to the sub-frame 2. The actuator 12 is operatively connected to the spring seats 6, 7 in order for the actuator 12 to be able to move the spring seats 6, 7 along the leaf spring 5 in a transverse direction of the vehicle (as indicated by the arrows) upon a command to the actuator 12. The actuator 12 may be an electrical actuator, a hydraulic actuator or a mechanical actuator. Other kinds of actuators are of course possible. The actuator 12 is arranged to receive output signals from various kinds of output sources such as sensors or vehicle control systems. The output signals are converted to suitable input signals for the actuator 12 determining the distance the spring seats 6, 7 are to be moved.

Locating features similar to those described above in relation to FIGS. 2 and 3 may be provided to define discrete positions for the spring seats 6, 7. Alternatively, the surface of the leaf spring 5 along with the spring seats 6, 7 move may be essentially smooth in order for the actuator to be able to continuously or infinitely adjust the location of the spring seats to be able to fine-tune the spring rate of the leaf spring. The first spring seat 6 does not have to be moved an equal distance as the second spring seat 7 but may be moved a greater or a smaller distance or not be moved at all depending on how the suspension is meant to be adjusted.

The illustrated manner in which the spring seats 6, 7 are fastened to the actuator 12 is only an example and is not to be limiting. Any suitable way of fasten the spring seats 6, 7 to an actuator 12 falls within the scope of the invention. The spring seats 6, 7 are shown to be located on top of the leaf spring 5. Other placements of the spring seats 6, 7 in relation to the leaf spring 5 fall within the scope of the invention.

The use of an actuator allows adjustment to be made to the spring rate after assembly of the vehicle and without having to remove parts of the vehicle in order to access the leaf spring. The reason for allowing the spring seats to be moved continuously is to be able to fine-tune the spring rate of the leaf spring.

When a leaf spring 5 with locating features 8, 9 uses an actuator 12 to adjust the location of the spring seats 6, 7, the spring seats may be adapted to have features corresponding to the lumps, indentations, cavities or protrusions or similar features of the leaf spring 5 on all sides of the spring seats 6, 7. The spring seats 6, 7 are arranged to be moved by rolling along the leaf spring 5 between the locating features 8, 9, i.e. by for instance rotating a quarter turn between each locating feature. Other designs of the spring seats 6, 7 shown in the figures allows for different arrangements of the spring seats 6, 7 to be moved between the locating features.

The actuator 12 may be fastened to the sub-frame 2 using fasteners 13, 14.

The sub-frame 2 of FIG. 5 may also comprise openings (not shown) having a transverse extension along the leaf spring 5. The size of the openings corresponds to the amount of adjustment that is desirable and may be varied depending on the model of the vehicle. The spring seats 6, 7 may in this case be arranged to be fastened to the openings in such a way that they can run freely in the openings. The fastening means used may be any fastening means known in the art for allowing a bolt or screw or similar to be allowed to run freely in an opening, and may include a bearing arrangement or any other arrangement that allows for transverse motion but not longitudinal motion. The openings may have an extension corresponding to the distance between the innermost and outermost holes of hole sets 10, 11 described in the first embodiment of the invention, but may have an extension that exceeds or is less than the distance between the outer and inner holes of holes 10, 11. The locations and extents of the openings will correspond to the extension of the positions of the locating features for the first and second spring seats to be moved to.

The actuator 12 may be used to adjust the position of the spring seats by means of the output signal of a level sensor connected to the vehicle. The level sensor may be any sensor suitable for this application known in the art, such as a sensor that determines the vehicle load by monitoring the wheel position relative to the vehicle chassis and/or body. This is valid for both the case where the spring seats are positioned by discrete locating features and where they can be moved continuously. This may be useful, for, instance to be able to compensate for a heavy load such as, for instance, a trailer or another form of towed carriage attached to the vehicle.

The position of the spring seats may also be adjusted dynamically by the actuator 12 by means of the output signal of at least one vehicle sensor being able to determine the vehicle dynamics. This may be used to compensate for changing vehicle dynamics that may change due to changing conditions of the vehicle or the road. It may also be used as to compensate for roll steer. The vehicle dynamics sensor may be any sensor suitable for determining vehicle dynamics known in the art.

The actuator 12 may also receive as input signals the output from a vehicle control system being operated by a driver or other occupant of the vehicle. The driver/occupant may be able to set a desired spring rate comfort level by adjusting a comfort level switch. A driver may want to change the suspension setting between different modes such as a comfort mode or a sport mode. A suitable comfort level/mode switch may be a knob or a dial or another form or analogue output, but the comfort level/mode switch may also be integrated into the digital control system of the vehicle and may be adjusted by changing a digital value, the digital value being transformed into a analogue or digital signal suitable for the actuator 12.

When the actuator 12 is a mechanical actuator the actuator 12 may be operated by a rod that on one side is right hand threaded and on the other side is left hand threaded. In the middle of the rod a sleeve is assembled around the rod with corresponding right hand and left hand threads. Rotation of this sleeve moves the spring seats 6, 7 along the leaf spring 5.

The suspension may also be adapted in such a way that the leaf spring 5 comprises a first leaf spring part and a second leaf spring part, the first leaf spring part being connected to the first control arm and the sub-frame, the second leaf spring part being connected to the second control arm. The first spring seat is adapted to be movable along the first leaf spring part and the second spring seat is adapted to be movable along the second leaf spring part. This variation of the invention may be used together with any of the described above features and embodiments. Adaptations for making the invention function with a leaf spring 5 comprising a first leaf spring part and a second leaf spring part such as for instance using two actuators, one for each leaf spring part and adjusting the sub-frame 2 or similar to be able to mount the two leaf spring parts lie well within the scope of the invention.

The use of separated first and second leaf springs may allow the use of a leaf spring suspension system where there is not enough room for one continuous leaf spring. Instead the leaf spring may be divided into a first part and a second part that may be mounted at an angle. This allows the use of a suspension with a leaf spring in the front or rear suspension of a vehicle where for instance an engine or another integral part of the vehicle may be in the way of a continuous leaf spring.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A suspension for a motor vehicle comprising:
a sub-frame for connection to a chassis of the vehicle;
a first control arm movably attached to a first end of the sub-frame and a second control arm movably attached to a second end of the sub-frame;

a leaf spring extending across the sub-frame and having a first end acting on the first control arm and a second end acting on the second control arm, a first plurality of locating features disposed on the leaf spring adjacent the first end thereof to define a first series of discrete mounting positions along the leaf spring, and a second plurality of locating features disposed on the leaf spring adjacent the second end thereof to define a second series of discrete mounting positions along the leaf spring;

a first spring seat located between the leaf spring and the sub-frame, the first spring seat movable relative to the leaf spring between at least a first and a second of the first series of mounting positions, the first spring seat being alternatively retained in the first or second mounting position by engagement with at least one of the first plurality of locating features; and a second spring seat located between the leaf spring and the sub-frame, the second spring seat movable relative to the leaf spring between at least a first and a second of the second series of mounting positions, the second spring seat being alternatively retained in the first or second mounting position by engagement with at least one of the second plurality of locating features.

2. The suspension of claim 1 wherein at least one of the first and second plurality of locating features comprises a series of protrusions extending from the leaf spring to engage at least one of the spring seats.

3. The suspension of claim 1 further comprising:
a first set of holes formed in the sub-frame, the first spring seat engaging at least one of the first set of holes to hold the first spring seat in a position relative to the sub-frame corresponding to at least one of the first series of mounting positions; and
a second set of holes formed in the sub-frame, the second spring seat engaging at least one of the second set of holes to hold the second spring seat in a position relative to the sub-frame corresponding to at least one of the second series of mounting positions.

4. The suspension of claim 1 further comprising an actuator operatively connected to the first and second spring seats and moving the first and second spring seats between the respective first and second mounting positions.

5. The suspension of claim 4 wherein the actuator is at least one of an electrical actuator, a hydraulic actuator, and a mechanical actuator.

6. The suspension of claim 4 wherein the actuator is activated in response to input from a driver.

7. A method of adjusting a suspension of a motor vehicle comprising:
moving a first spring seat and a second spring seat along a transverse length of a leaf spring, the leaf spring supported relative to a sub-frame by the spring seats and having opposite first and second ends acting on a first control arm and a second control arm respectively, the first and second control arms movably attached to respective first and second ends of the sub-frame, wherein movement of the first spring seat places the first spring seat in sequential engagement with a first plurality of locating features on the leaf spring at a first range of positions and engagement between the first spring seat and at least one of the first plurality of locating features retains the first spring seat at a desired position in the first range of positions, and movement of the second spring seat places the second spring seat in sequential engagement with a second plurality of locating features on the leaf spring at a second range of positions and engagement between the second spring seat and at least one of the second plurality of locating features retains the second spring seat at a desired position in the second range of positions.

8. The method of claim 7 further comprising moving the first and second spring seats equal distances away from and toward a longitudinal centerline of the leaf spring in order to increase and decrease respectively an effective spring rate of the leaf spring.

9. The method of claim 7 further comprising moving the first and second spring seats differentially along the leaf spring to change spring rates of the leaf spring acting on the first and second control arms respectively by different amounts.

10. The method of claim 7 further comprising activating at least one of an electrical actuator, a hydraulic actuator, and a mechanical actuator to move the first and second spring seats.

11. The method of claim 10 wherein the actuator is activated in response to input from a driver.

12. A suspension for a motor vehicle comprising:
a sub-frame for connection to a chassis of the vehicle;
a first control arm movably attached to a first end of the sub-frame and a second control arm movably attached to a second end of the sub-frame;
a leaf spring extending across the sub-frame and having a first end acting on the first control arm and a second end acting on the second control arm;
a first spring seat located between the leaf spring and the sub-frame, the first spring seat movable over a first range of positions relative to the leaf spring;
a second spring seat located between the leaf spring and the sub-frame, the second spring seat movable over a second range of positions relative to the leaf spring;
an actuator operatively connected to the first and second spring seats and moving the first and second spring seats across the respective first and second ranges of positions to change a spring rate of the leaf spring;
a first set of holes formed in the sub-frame, the first spring seat engaging at least one of the first set of holes to hold the first spring seat in a position corresponding to the first range of positions; and
a second set of holes formed in the sub-frame, the second spring seat engaging at least one of the second set of holes to hold the second spring seat in a position corresponding to the second range of positions.

13. The suspension of claim 12 wherein the actuator is at least one of an electrical actuator, a hydraulic actuator, and a mechanical actuator.

14. The suspension of claim 12 wherein the actuator is activated in response to input from a driver.

15. The suspension of claim 12 wherein:
the first range of positions is defined by a first plurality of locating features engageable with the first spring seat to hold the first spring seat fixed relative to the leaf spring at any one of a plurality of first discrete positions within the first range of positions; and
the second range of positions is defined by a second plurality of locating features engageable with the second spring seat to hold the second spring seat fixed relative to the leaf spring at any one of a plurality of second discrete positions within the second range of positions.

16. The suspension of claim 15 wherein at least one of the first and second plurality of locating features comprises a series of protrusions extending from the leaf spring.

* * * * *